(12) United States Patent
Cho

(10) Patent No.: US 9,823,513 B2
(45) Date of Patent: Nov. 21, 2017

(54) METHOD FOR MANUFACTURING LIQUID CRYSTAL DEVICE

(71) Applicant: Samsung Display Co., Ltd., Yongin, Gyeonggi-Do (KR)

(72) Inventor: Hyeon Gu Cho, Yongin-si (KR)

(73) Assignee: Samsung Display Co., Ltd. (KR)

( * ) Notice: Subject to any disclaimer, the term of this patent is extended or adjusted under 35 U.S.C. 154(b) by 148 days.

(21) Appl. No.: 14/458,077

(22) Filed: Aug. 12, 2014

(65) Prior Publication Data

US 2015/0072457 A1    Mar. 12, 2015

(30) Foreign Application Priority Data

Sep. 9, 2013    (KR) .................. 10-2013-0108001

(51) Int. Cl.
*G02F 1/1337*    (2006.01)
(52) U.S. Cl.
CPC .. *G02F 1/133711* (2013.01); *G02F 1/133719* (2013.01); *G02F 1/133723* (2013.01); *G02F 1/133788* (2013.01); *G02F 2001/133742* (2013.01)

(58) Field of Classification Search
CPC .................................................. G02F 1/1333
See application file for complete search history.

(56) References Cited

U.S. PATENT DOCUMENTS

| | | | |
|---|---|---|---|
| 7,615,260 B2 | 11/2009 | Yoneya et al. | |
| 7,760,300 B2 | 7/2010 | Ham et al. | |
| 8,004,640 B2 | 8/2011 | Hanaoka et al. | |
| 8,163,199 B2 | 4/2012 | Lee et al. | |
| 8,349,413 B2 | 1/2013 | Chiang et al. | |
| 8,414,983 B2 | 4/2013 | Parri et al. | |
| 2009/0141060 A1* | 6/2009 | Kwon ................ | B41J 3/28 347/14 |
| 2011/0128486 A1* | 6/2011 | Kim .................. | G02F 1/133719 349/123 |
| 2011/0292306 A1 | 12/2011 | Kim et al. | |

FOREIGN PATENT DOCUMENTS

KR    1020110067574 A    6/2011

\* cited by examiner

*Primary Examiner* — Michael Jung
*Assistant Examiner* — Mikka Liu
(74) *Attorney, Agent, or Firm* — Innovation Counsel LLP

(57) ABSTRACT

A manufacturing method of a liquid crystal display includes: forming a first alignment layer on a passivation layer and a pixel electrode to form a first display panel; forming a second alignment layer on a common electrode to form a second display panel; and combining the first and the second display panels, wherein formation of the first and second alignment layers includes spraying a first alignment mixture and second alignment mixture on, respectively, the first and second display panels using an inkjet head while moving the inkjet head across the first and second display panels to form a first alignment mixture layer and a second alignment mixture layer, and hardening the first and second alignment mixture layers, and spray progressing directions of the first and second alignment mixture are more than 7 degrees to less than 45 degrees with respect to the first substrate and the second substrate respectively.

13 Claims, 8 Drawing Sheets

(a)

(b)

METHOD FOR MANUFACTURING LIQUID CRYSTAL DEVICE

CROSS-REFERENCE TO RELATED APPLICATION

This application claims priority to and the benefit of Korean Patent Application No. 10-2013-0108001 filed in the Korean Intellectual Property Office on Sep. 9, 2013, the entire contents of which are incorporated herein by reference.

BACKGROUND (a) Technical Field

The present invention relates to a manufacturing method of a liquid crystal display.

(b) Description of the Related Art

Liquid crystal displays (LCDs) are one of the most widely used flat panel displays, and an LCD includes a pair of panels provided with field-generating electrodes and a liquid crystal (LC) layer interposed between the two panels. The LCD displays images by applying signals to the field-generating electrodes to generate an electric field in the LC layer. The generated electric field determines the orientation of LC molecules therein to adjust polarization of incident light.

The liquid crystal display includes a thin film transistor array panel and a common electrode panel facing each other. The thin film transistor array panel includes a gate line transmitting a gate signal and a data line transmitting a data signal, and intersecting each other, a thin film transistor connected to the gate line and the data line, and a pixel electrode connected to the thin film transistor. The common electrode panel includes a light blocking member, a color filter, and a common electrode.

The liquid crystal display may use an alignment layer including a reactive mesogen (RM) to improve response speed. The alignment layer may be formed by using an inkjet printing method.

The above information disclosed in this Background section is only for enhancement of understanding of the background of the disclosure and therefore it may contain information that does not form the prior art that is already known to a person of ordinary skill in the art.

SUMMARY

A manufacturing method of a liquid crystal display that may prevent vertical line stains of an alignment layer from being generated when forming an alignment layer by an inkjet printing method is provided.

A manufacturing method of a liquid crystal display includes: forming a first alignment layer on a passivation layer and a pixel electrode after forming a gate line, a semiconductor layer, a data line, a drain electrode, the passivation layer, and the pixel electrode on a first substrate to form a first display panel; forming a second alignment layer on a common electrode after forming a light blocking member, a color filter, and the common electrode on a second substrate to form a second display panel; and combining the first display panel and the second display panel, where the formation of the first alignment layer includes spraying a first alignment mixture on the passivation layer and the pixel electrode using an inkjet head while moving the inkjet head across the first display panel to form a first alignment mixture layer, and hardening the first alignment mixture layer, the formation of the second alignment layer includes spraying a second alignment mixture on the common electrode using an inkjet head while moving the inkjet head across the second display panel to form a second alignment mixture layer, and hardening the second alignment mixture layer, and where a spray progressing directions of the spraying of the first alignment mixture and the second alignment mixture are more than 7 degrees to less than 45 degrees with respect to the first substrate and the second substrate, respectively.

The first alignment mixture and the second alignment mixture may be formed by mixing an alignment layer material including polyamic acid, a polyimide, or lecithin and a photo-polymerizable monomer or oligomer.

The method may further include, after combining the first display panel and the second display panel, injecting liquid crystal molecules between the first display panel and the second display panel to form a liquid crystal layer.

The method may further include, after forming the liquid crystal layer, applying an electric field to the liquid crystal layer and exposing the liquid crystal layer to light to polymerize the photo-polymerizable monomer or oligomer in the first alignment layer and the second alignment layer, thereby respectively forming a first alignment control agent and a second alignment control agent in the surfaces of the first alignment layer and the second alignment layer.

The photo-polymerizable monomer or oligomer may be a reactive mesogen.

The formation of the first display panel after forming the first alignment layer may include exposing the first alignment layer to light in a state in which an electric field is applied to the first alignment layer to polymerize the photo-polymerizable monomer or oligomer in the first alignment layer, thereby forming the first alignment control agent in the surface of the first alignment layer.

The formation of the second display panel after forming the second alignment layer may include exposing the second alignment layer in a state in which the electric field is applied to the second alignment layer to polymerize the photo-polymerizable monomer or oligomer in the second alignment layer, thereby forming the second alignment control agent in the surface of the second alignment layer.

A method for manufacturing a liquid crystal display panel includes forming a passivation layer and pixel electrode on a first display panel; spraying a first alignment mixture from an inkjet head onto the passivation layer and pixel electrode while moving the inkjet head across in an oblique direction with respect to the first display panel; hardening the first alignment mixture to form a first alignment layer, and combining the first display panel with a second display panel, where an angle between the inkjet head and a plane of the first display panel is in a range of more than 7 degrees and less than 45 degrees.

The method for manufacturing a liquid crystal display panel of Claim 11 may further include spraying a second alignment mixture from the inkjet head onto the second display panel while moving the inkjet head across in an oblique direction with respect to the second display panel; and hardening the second alignment mixture to form a second alignment layer, where an angle between the inkjet head and a plane of the second display panel is in a range of more than 7 degrees and less than 45 degrees.

The first alignment mixture and the second alignment mixture may be formed by mixing an alignment layer material including polyamic acid, a polyimide, or lecithin and a photo-polymerizable monomer or oligomer.

According to the present disclosure, when forming the first and second alignment layers by the inkjet printing method, the progressing direction of the inkjet head spraying the first and second alignment mixtures is more than 7 degrees to less than 45 degrees with respect to the first and second substrates such that vertical line stains of the first and second alignment layers may be prevented.

DETAILED DESCRIPTION OF THE EMBODIMENTS

Figure 1:
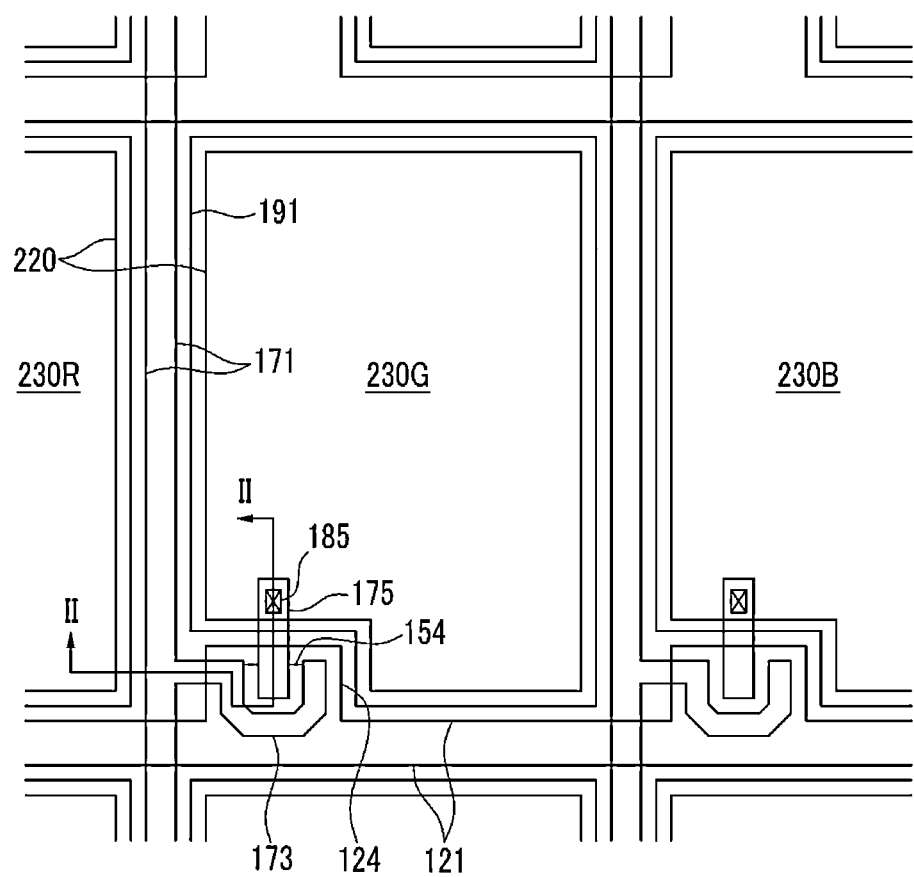
FIG. 1 is a layout view of a liquid crystal display according to an example embodiment.

Example embodiments will be described more fully hereinafter with reference to the accompanying drawings, in which example embodiments of the disclosure are shown. As those skilled in the art would realize, the described embodiments may be modified in various different ways, all without departing from the spirit or scope of the present invention.

The drawings and description are to be regarded as illustrative in nature and not restrictive. Like reference numerals designate like elements throughout the specification.

Further, because sizes and thicknesses of constituent members shown in the accompanying drawings are arbitrarily given for better understanding and ease of description, the present invention is not limited thereto.

In the drawings, the thickness of layers, films, panels, regions, etc., are exaggerated for clarity. In the drawings, for better understanding and ease of description, the thicknesses of some layers and areas are exaggerated. It will be understood that when an element such as a layer, film, region, or substrate is referred to as being "on" another element, it can be directly on the other element, or intervening elements may also be present.

In addition, unless explicitly described to the contrary, the word "comprise" and variations such as "comprises" or "comprising" will be understood to imply the inclusion of stated elements but not the exclusion of any other elements.

Figure 2:
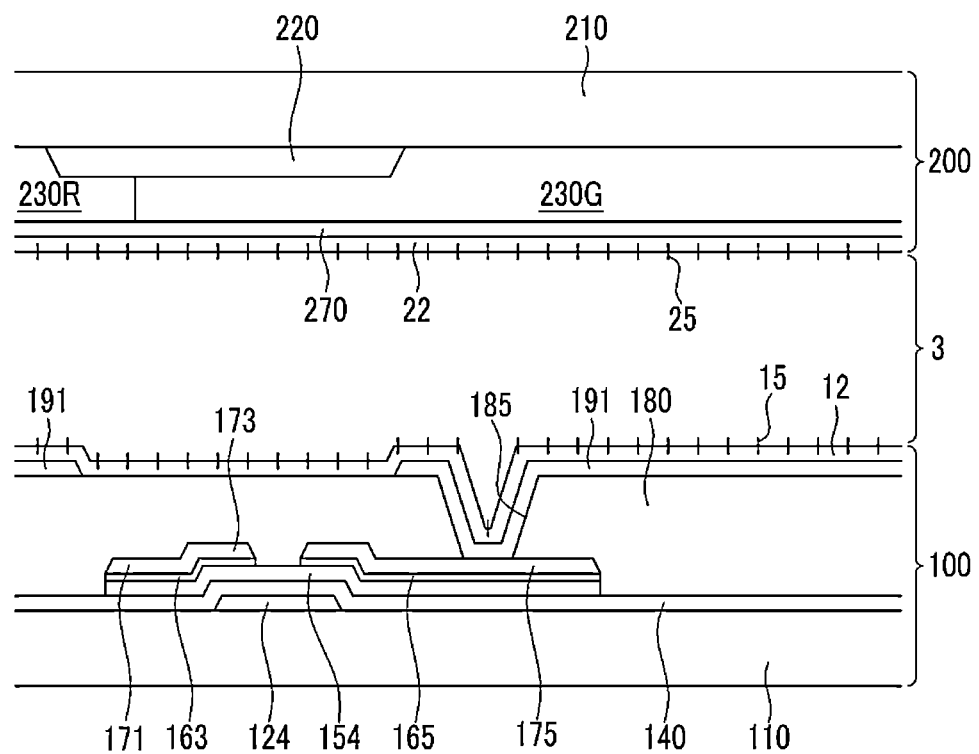
FIG. 2 is a cross-sectional view taken along the line II-II of FIG. 1.

FIG. 1 is a layout view of a liquid crystal display according to an example embodiment, and FIG. 2 is a cross-sectional view taken along the line II-II of FIG. 1.

Referring to FIG. 1 and FIG. 2, a liquid crystal display according to an example embodiment includes a first display panel 100 and a second display panel 200 facing each other, and a liquid crystal layer 3 interposed therebetween.

The liquid crystal layer 3 includes a plurality of liquid crystal molecules, and the liquid crystal molecules may be arranged such that long axes thereof are aligned perpendicularly to surfaces of the first display panel 100 and to the second display panel 200 in the absence of an electric field.

The first display panel 100 will now be described.

A plurality of gate lines 121 are disposed on a first substrate 110 made of an insulating material such as glass or plastic.

The gate lines 121 transmit a gate signal and mainly extend in a transverse direction. Each gate line 121 includes a plurality of gate electrodes 124 protruding upward.

A gate insulating layer 140 is disposed on the gate lines 121, a semiconductor layer 154 is disposed on the gate insulating layer 140 over the gate electrode 124, and a plurality of ohmic contacts 163 and 165 are disposed on the semiconductor layer 154.

The semiconductor layer 154 may be made of amorphous silicon, and the ohmic contacts 163 and 165 may be formed of a material such as n+ hydrogenated amorphous silicon in which an n-type impurity is doped with a high concentration, or of silicide. The semiconductor 154 may be called a semiconductor together with the ohmic contacts 163 and 165, and the semiconductor may mean a polysilicon semiconductor or an oxide semiconductor.

A plurality of data lines 171 include a plurality of source electrodes 173 and a plurality of drain electrodes 175. The plurality of source electrodes 173 extend toward the gate electrode 124. The plurality of drain electrodes 175 are separated from the data lines 171 and face the source electrodes 173 with respect to the gate electrode 124. The plurality of drain electrodes 175 and the plurality of source electrodes 173 are disposed on the ohmic contacts 163 and 165 and the gate insulating layer 140.

The ohmic contacts 163 and 165 are disposed between the semiconductor layer 154 and the data line 171 and drain electrode 175, thereby reducing contact resistance therebetween.

One gate electrode 124, one source electrode 173, and one drain electrode 175 constitute one thin film transistor (TFT) along with the semiconductor 154. The channel of the thin film transistor is formed in the semiconductors 154 between the source electrode 173 and the drain electrode 175.

A passivation layer 180 is disposed on the gate insulating layer 140, the data line 171, and the drain electrode 175. A contact hole 185 to expose the drain electrode 175 is formed in the passivation layer 180. The passivation layer 180 may be made of an organic insulator, and a surface thereof may be flat.

The passivation layer 180 may have a dual-layer structure of a lower inorganic layer and an upper organic layer so that excellent insulating characteristics of the organic layer are ensured and there is no damage to the exposed portions of the semiconductors 154.

A pixel electrode 191 is disposed on the passivation layer 180. The pixel electrode 191 may be made of a transparent conductive material such as indium tin oxide (ITO) or indium zinc oxide (IZO), or of a reflective metal such as aluminum or an alloy of silver. The pixel electrode 191 contacts the drain electrode 175 through the contact hole 185.

A first alignment layer 12 is disposed on the pixel electrode 191. A first alignment control agent 15 is formed on a surface of the first alignment layer 12.

Next, the second display panel 200 will be described.

A light blocking member 220 is disposed on a second substrate 210 made of an insulating material such as glass or plastic, and color filters 230R, 230G, and 230B are formed on the light blocking member 220.

A common electrode 270 is disposed on the light blocking member 220 and the color filters 230R, 230G, and 230B. A second alignment layer 22 is disposed on the common electrode 270. A second alignment control agent 25 is disposed on a surface of the second alignment layer 22.

The first alignment layer 12 and the second alignment layer 22 are liquid crystal vertical alignment layers made of a material such as polyamic acid, a polyimide, or lecithin, and the liquid crystal molecules of the liquid crystal layer are substantially aligned in the direction perpendicular to the plane of the first display panel 100 and the second display panel 200 by the first alignment layer 12 and the second alignment layer 22.

The first alignment control agent 15 protrudes from the first alignment layer 12. The second alignment control agent 25 protrudes from the second alignment layer 22. The long axis of each alignment control agent protrudes from its respective alignment layer at a pretilt with a polar angle. The first and second alignment control agents 15 and 25 are formed by photo-polymerizing the photo-polymerizable monomer or oligomer.

The photo-polymerizable monomer or oligomer may be a reactive mesogen (RM). The reactive mesogen (RM) may be a polymerizable reactive mesogen compound. The mesogen compound or mesogen material includes a material or compounds with a mesogen radical of at least one of a stick, plate, or disk shape, that is, a radical that is capable of generating a liquid crystalline phase behavior. The liquid crystal compound having a radical in the shape of a stick or a rod is a calamitic liquid crystal that is known to a person of ordinary skill in the art, while the liquid crystal compound having a radical in the shape of a disk or a plate is a discotic liquid crystal that is known to a person of ordinary skill in the art. The compound or material that includes the mesogen radical does not need to display a liquid crystalline phase. Also, liquid crystalline phase behavior may be shown through mixture with another compound, or a mesogen compound or material, or when their mixture is polymerized.

The reactive mesogen is polymerized by light such as ultraviolet rays, and it may be a material that is aligned based on the alignment state of the nearby material. An example of the reactive mesogen can be a compound that is expressed in the following formula:

P1-A1-(Z1-A2)n-P2

Here, P1 are P2 are independently selected from among, for example, acrylate, methacrylate, vinyl, vinyloxy, and epoxy groups; A1 and A2 are independently selected from, for example, 1,4-phenylene and naphthalene-2,6-diyl groups; Z1 is, for example, one of COO—, OCO—, and a single bond; and n is one of, for example, 0, 1, or 2.

In further detail, an example of the reactive mesogen can be a compound expressed as one of Chemical Formula 1 to Chemical Formula 3.

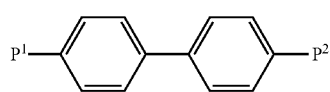

[Chemical Formula 1]

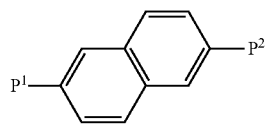

[Chemical Formula 2]

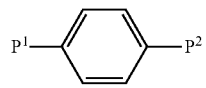

[Chemical Formula 3]

Here, P1 and P2 are independently selected from acrylate, methacrylate, vinyl, vinyloxy, and epoxy groups.

Because the first alignment layer 12 and the second alignment layer 22 are formed with a material having a vertical alignment characteristic, the liquid crystal molecules of the liquid crystal layer 3 are vertically aligned in the earlier stage. Because the first alignment control agent 15 and the second alignment control agent 25, however, have a pre-tilt with a predetermined polar angle with reference to the direction perpendicular to the surface of the first display panel 100 and the second display panel 200, alignment of the liquid crystal molecules is changed by the alignment force of the first alignment control agent 15 and the second alignment control agent 25, so the liquid crystal molecules are tilted with a predetermined polar angle with reference to the direction perpendicular to the surfaces of the first display panel 100 and the second display panel 200.

Next, a manufacturing method of a liquid crystal display according to an example embodiment will be described with reference to FIG. 3 to FIG. 7 and FIG. 2.

Figure 3:
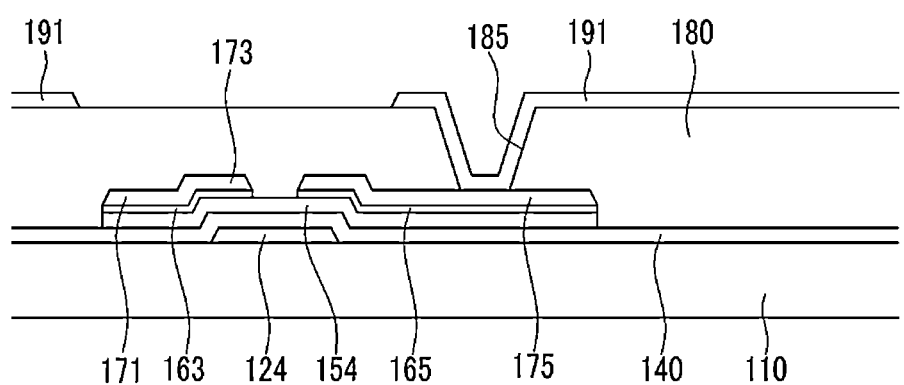
FIG. 3 to FIG. 5 are views showing a manufacturing method of a first display panel.
Figure 4:
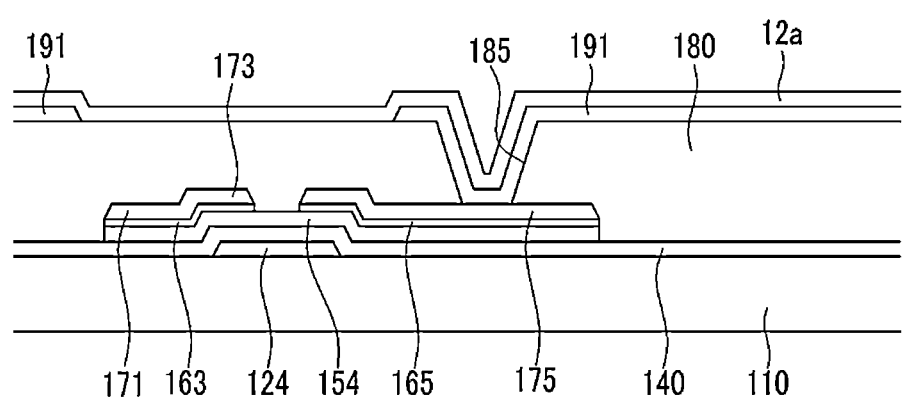
Figure 5:
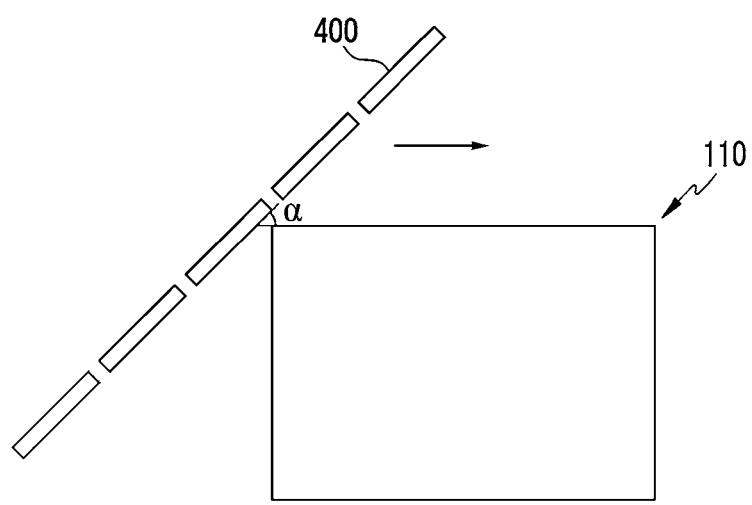
Figure 6:
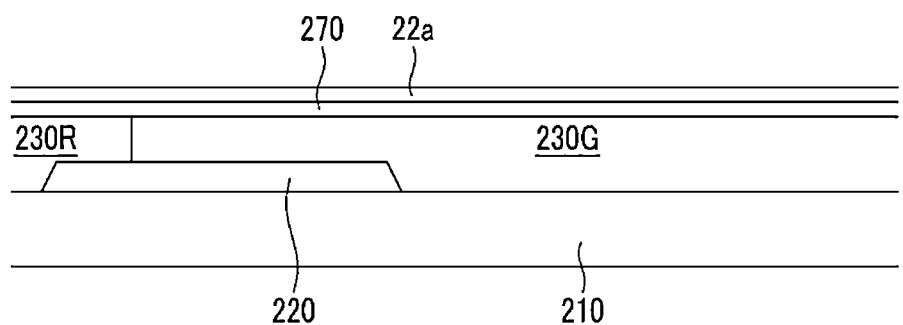
FIG. 6 and FIG. 7 are views showing a manufacturing method of a second display panel.
Figure 7:
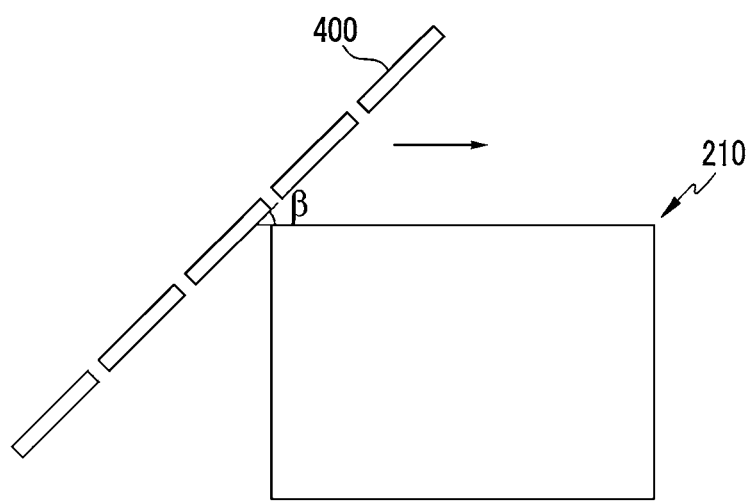

FIG. 3 to FIG. 5 are views showing a manufacturing method of a first display panel, and FIG. 6 and FIG. 7 are views showing a manufacturing method of a second display panel.

Referring to FIG. 3, thin film layers such as a gate line 121 including a gate electrode 124, a gate insulating layer 140, a semiconductor layer 154, ohmic contacts 163 and 165, a data line 171 including a source electrode 173, a drain electrode 175, a passivation layer 180, and a pixel electrode 191 are formed on a first substrate 110 by using methods such as thin film deposition, photolithography, photo-etching, etc.

Referring to FIG. 4, a first alignment mixture in which an alignment layer material such as polyamic acid, a polyimide, or lecithin and a photo-polymerizable monomer or oligomer are mixed is coated on the pixel electrode 191 and the passivation layer 180 to form a first alignment mixture layer 12a. The thickness of the first alignment mixture layer 12a is relatively uniform, and thickness difference of the first alignment mixture layer 12a between arbitrary positions in one pixel may be less than 50 Å, and in particular, less than 30 Å.

The coating of the first alignment mixture is performed by an inkjet printing method.

The inkjet printing method will be described with reference to FIG. 5.

FIG. 5 is a view illustrating the coating of the first alignment mixture by the inkjet printing method.

Referring to FIG. 5, the first alignment mixture is coated on a first substrate 110 formed with the thin film by the inkjet printing method.

The inkjet printing method uses a plurality of inkjet heads 400. Each inkjet head 400 includes a plurality of nozzles (not shown). The first alignment mixture is sprayed from each nozzle.

The first alignment mixture is sprayed onto the first substrate 110 while the inkjet head 400 is moved in an oblique direction with respect to the first substrate 110. During the spraying operation the inkjet head 400 is inclined and moved with respect to the first substrate 110, and it is most useful that an angle (α) between the inkjet head 400 and the first substrate 110 is more than 7 degrees and less than 45 degrees, but other angles may be used.

That is, in the inkjet head 400, a spray progressing direction of the first alignment mixture is more than 7 degrees less than 45 degrees with respect to the first substrate 110.

Referring to FIG. 6, thin films such as a light blocking member 220, color filters 230R, 230G, and 230B, and a common electrode 270 are formed on a second substrate 210 by using methods such as thin film deposition, photolithography, and photo-etching. A second alignment mixture in which the alignment layer material such as polyamic acid, a polyimide, or lecithin and the photo-polymerizable monomer or oligomer are mixed is coated on the common electrode 270 to form a second alignment mixture layer 22a. The thickness of the second alignment mixture layer 22 a is relatively uniform, and a thickness difference of the second alignment mixture layer 22a between arbitrary positions in one pixel may be less than 50 Å, and in particular, less than 30 Å.

The coating of the second alignment mixture is performed by the inkjet printing method.

Next, the inkjet printing method will be described with reference to FIG. 7.

FIG. 7 is a view illustrating the coating of the second alignment mixture by the inkjet printing method.

Referring to FIG. 7, the second alignment mixture is coated on a second substrate 210 formed with the thin film by the inkjet printing method.

The inkjet printing method uses a plurality of inkjet heads 400. Each inkjet head 400 includes a plurality of nozzles (not shown). The second alignment mixture is sprayed from each nozzle.

The second alignment mixture is sprayed onto the second substrate 210 while the inkjet head 400 is moved in an oblique direction with respect to the second substrate 210. During the spraying operation, the inkjet head 400 is inclined and moved with respect to the second substrate 210, and it is most useful that an angle (β) between the inkjet head 400 and the second substrate 210 is more than 7 degrees and less than 45 degrees, but other angles may be used. That is, in the inkjet head 400, a spray progressing direction of the second alignment mixture is more than 7 degrees 10 and less than 45 degrees with respect to the second substrate 210.

Referring to FIG. 1, after the first alignment mixture layer 12a and the second alignment mixture layer 22a are hardened to respectively form the first alignment layer 12 and the second alignment layer 22, the first display panel 100 and the second display panel 200 are combined, and then liquid crystal molecules are injected between the first display panel 100 and the second display panel 200 to form a liquid crystal layer 3. The first and second alignment mixture layer may be hardened by any one of a number of methods known to those of ordinary skill in the art, for example, by an ultraviolet irradiation. Here, for the formation of the liquid crystal layer 3, the liquid crystal molecules may be dripped on the first display panel 100 or the second display panel 200, and then the first display panel 100 and the second display panel 200 may be combined to face each other.

Next, an electric field is applied to the liquid crystal layer 3 and the first and second display panels 100 and 200 are exposed to light while the electric field is applied to polymerize the photo-polymerizable monomer or oligomer in the first alignment layer 12 and the second alignment layer 22, thereby respectively forming the first alignment control agent 15 and the second alignment control agent 25 in the surfaces of the first alignment layer 12 and the second alignment layer 22.

Alternatively, the first display panel 100 and the second display panel 200 may be combined after the first alignment control agent 15 and the second alignment control agent 25 are first formed.

For example, for the formation of the first alignment control agent 15 and the second alignment control agent 25, the first alignment mixture layer 12a and the second alignment mixture layer 22a are hardened to respectively form the first alignment layer 12 and the second alignment layer 22. Then, while the electric field is applied to the first alignment layer 12 and the second alignment layer 22, the first alignment layer 12 and the second alignment layer 22 may be exposed to light to polymerize the photo-polymerizable monomer or oligomer in the first alignment layer 12 and the second alignment layer 22, thereby respectively forming the first alignment control agent 15 and the second alignment control agent 25 in the surfaces of the first alignment layer 12 and the second alignment layer 22. The electric field application may use the pixel electrode 191 and the common electrode 270 formed in the first display panel 100 and the second display panel 200, or an electric field application device that is separately provided may be used.

As described above, when forming the first and second alignment layers 12 and 22 by the inkjet printing method, the spray progressing directions of the first and second alignment mixtures are more than 7 degrees and less than 45 degrees with respect to the first substrate 110 and the second substrate 210 such that vertical line stains of the first and second alignment layers 12 and 22 may be prevented.

Now, an effect of preventing stains of the vertical line shape of the alignment layer in the manufacturing method of the liquid crystal display according to an example embodiment will be described with reference to FIG. 8.

Figure 8:
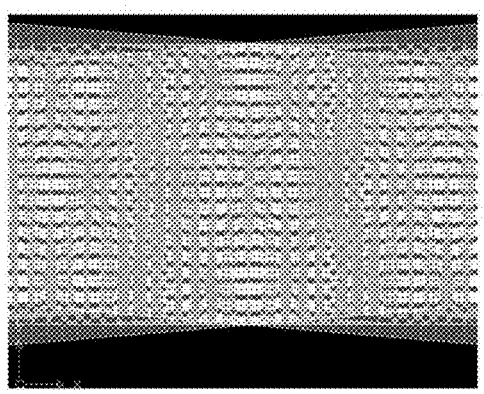
FIG. 8 is a simulation picture comparing an alignment layer formed according to an example embodiment and an alignment layer formed according to a comparative example when forming an alignment layer by an inkjet printing method.
Figure 8:
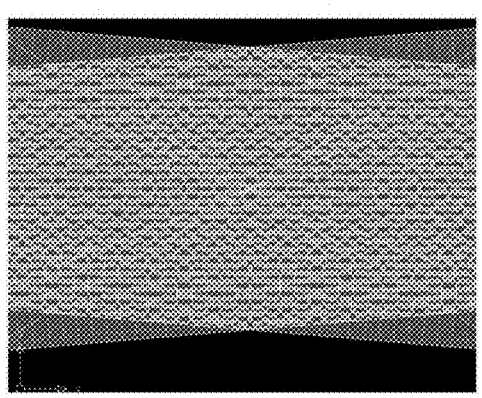

FIG. 8 is a simulation picture comparing an alignment layer formed according to an example embodiment and an alignment layer formed according to a comparative example when forming an alignment layer by an inkjet printing method.

FIG. 8 (a) shows a simulation of an alignment layer formed according to a comparative example in which the alignment layer is formed with the spray progressing direction of the first and second alignment mixtures at 5 degrees with respect to the first substrate and the second substrate.

FIG. 8 (b) shows a simulation of an alignment layer formed according to an example embodiment in which the alignment layer is formed with the spray progressing directions of the first and second alignment mixtures at 10 degrees with respect to the first substrate and the second substrate.

Referring to FIGS. 8 (a) and (b), in the case of the alignment layer formed according to the comparative example, that is, where the alignment layers are formed with the spray progressing directions of the first and second alignment mixtures of 5 degrees with respect to the first and second substrates, vertical line stains are generated as shown in FIG. 8(a).

In the case of the alignment layer formed according to an example embodiment, that is, where the alignment layers are formed with the spray progressing directions of the first and second alignment mixtures of 10 degrees with respect to the first and second substrates, the vertical line stains are not present as shown in FIG. 8(b).

As described above, the alignment layer formed according to example embodiments prevents the vertical line stains.

While example embodiments has been described in connection with what is presently considered to be practical example embodiments, it is to be understood that the invention is not limited to the disclosed embodiments, but, on the contrary, is intended to cover various modifications and equivalent arrangements included within the spirit and scope of the disclosure, including the appended claims.

DESCRIPTION OF SYMBOLS

| | |
|---|---|
| 12: first alignment layer | 12a: first alignment mixture layer |
| 15: first alignment control agent | 22: second alignment layer |
| 22a: second alignment mixture layer | 25: second alignment control agent |
| 100: first display panel | 110: first substrate |
| 121: gate line | 124: gate electrode |
| 154: semiconductor layer | 171: data line |
| 173: source electrode | 175: drain electrode |
| 191: pixel electrode | 200: second display panel |
| 270: common electrode | 400: inkjet head |

What is claimed is:

1. A manufacturing method of a liquid crystal display comprising:
    forming a first alignment layer on a passivation layer and a pixel electrode after forming a gate line, a semiconductor layer, a data line, a drain electrode, the passivation layer, and the pixel electrode on a first substrate to form a first display panel;
    forming a second alignment layer on a common electrode after forming a light blocking member, a color filter, and the common electrode on a second substrate to form a second display panel; and
    combining the first display panel and the second display panel,
    wherein the formation of the first alignment layer includes:
    spraying a first alignment mixture on the passivation layer and the pixel electrode using an inkjet head while moving the inkjet head across the first display panel to form a first alignment mixture layer, wherein the spraying is done while the inkjet head moves, along one direction, over the pixel electrode as the inkjet head is tilted to form an oblique angle with respect to edges of the first display panel, and
    hardening the first alignment mixture layer,
    wherein the formation of the second alignment layer includes:
    spraying a second alignment mixture on the common electrode using an inkjet head while moving the inkjet head across the second display panel to form a second alignment mixture layer, and
    hardening the second alignment mixture layer, and
    wherein spray progressing directions of the spraying of the first alignment mixture and the second alignment mixture are more than 7 degrees to less than 45 degrees with respect to the first substrate and the second substrate respectively.

2. The manufacturing method of claim 1, wherein the first alignment mixture and the second alignment mixture are formed by mixing an alignment layer material including polyamic acid, a polyimide, or lecithin and a photo-polymerizable monomer or oligomer.

3. The manufacturing method of claim 2, further comprising:
    after combining the first display panel and the second display panel,
    injecting liquid crystal molecules between the first display panel and the second display panel to form a liquid crystal layer.

4. The manufacturing method of claim 3, further comprising:
    after forming the liquid crystal layer,
    applying an electric field to the liquid crystal layer and exposing the liquid crystal layer to light to polymerize the photo-polymerizable monomer or oligomer in the first alignment layer and the second alignment layer, thereby respectively forming a first alignment control agent and a second alignment control agent in a surface of the first alignment layer and a surface of the second alignment layer.

5. The manufacturing method of claim 4, wherein the photo-polymerizable monomer or oligomer is a reactive mesogen.

6. The manufacturing method of claim 2, wherein the formation of the first display panel after forming the first alignment layer includes
    exposing the first alignment layer to light in a state in which an electric field is applied to the first alignment layer to polymerize the photo-polymerizable monomer or oligomer in the first alignment layer, thereby forming a first alignment control agent in a surface of the first alignment layer.

7. The manufacturing method of claim 6, wherein the formation of the second display panel after forming the second alignment layer includes
    exposing the second alignment layer to light in a state in which the electric field is applied to the second alignment layer to polymerize the photo-polymerizable monomer or oligomer in the second alignment layer, thereby forming a second alignment control agent in a surface of the second alignment layer.

8. The manufacturing method of claim 7, further comprising:
    after combining the first display panel and the second display panel,
    injecting liquid crystal molecules between the first display panel and the second display panel to form a liquid crystal layer.

9. The manufacturing method of claim 8, wherein the photo-polymerizable monomer or oligomer is a reactive mesogen.

10. The manufacturing method of claim 1, wherein a thickness difference of the first alignment mixture layer between arbitrary positions in a pixel is less than 50 angstroms, and
    a thickness difference of the second alignment mixture layer between arbitrary positions in a pixel is less than 50 angstroms.

11. A method for manufacturing a liquid crystal display panel comprising:
    forming a passivation layer and a pixel electrode on a first display panel;
    spraying a first alignment mixture from an inkjet head onto the passivation layer and an entire pixel electrode while moving, along one direction, the inkjet head across in an oblique direction with respect to the first display panel;
    hardening the first alignment mixture to form a first alignment layer, and combining the first display panel with a second display panel, wherein an angle between the inkjet head and a plane of the first display panel is in a range of more than 7 degrees and less than 45 degrees.

12. The method for manufacturing a liquid crystal display panel of claim 11, further comprising:

spraying a second alignment mixture from the inkjet head onto the second display panel while moving the inkjet head across in an oblique direction with respect to the second display panel; and hardening the second alignment mixture to form a second alignment layer, wherein an angle between the inkjet head and a plane of the second display panel is in a range of more than 7 degrees and less than 45 degrees.

13. The method of manufacturing a liquid crystal display panel of claim 12, wherein the first alignment mixture and the second alignment mixture are formed by mixing an alignment layer material including polyamic acid, a polyimide, or lecithin and a photo-polymerizable monomer or oligomer.

\* \* \* \* \*